R. A. WASS.
MOWING MACHINE.
APPLICATION FILED JULY 22, 1914. RENEWED OCT. 31, 1916.
1,212,427.  
Patented Jan. 16, 1917.
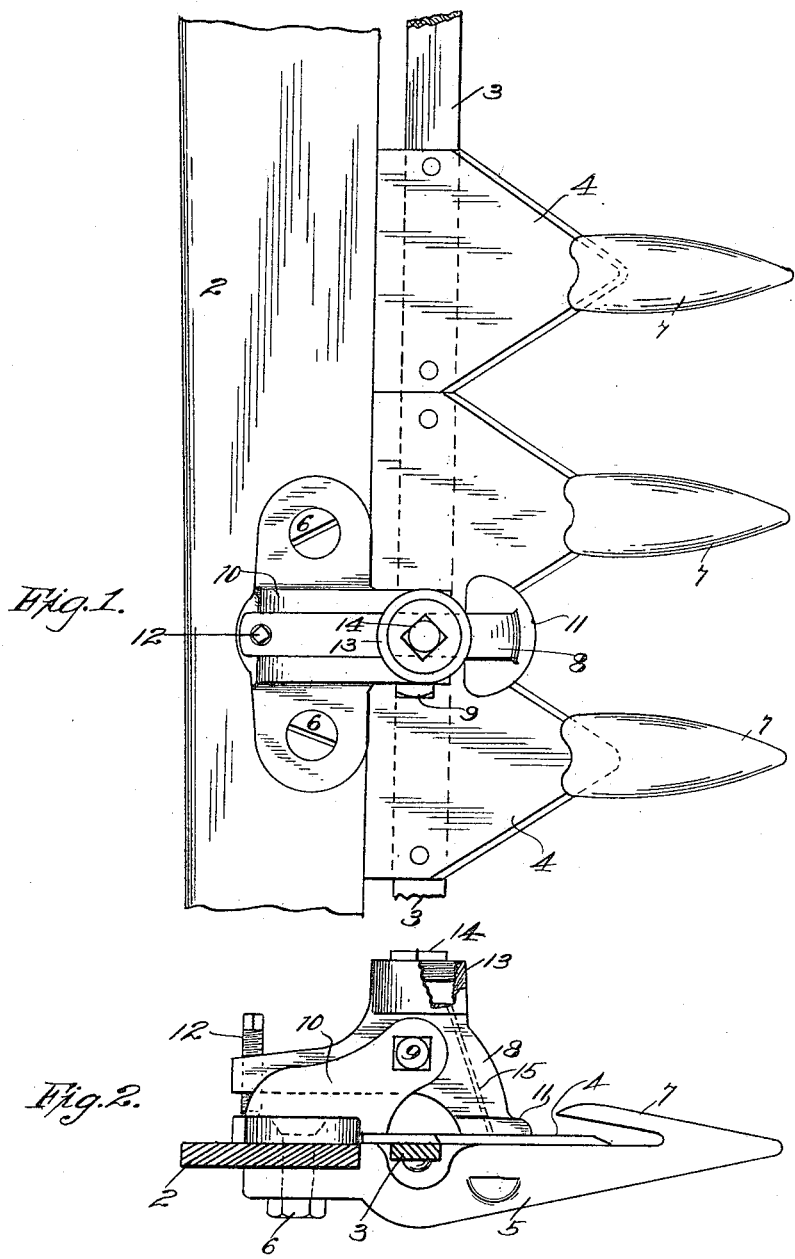

UNITED STATES PATENT OFFICE.

ROYAL A. WASS, OF BERKELEY, CALIFORNIA.

MOWING-MACHINE.

1,212,427.  Specification of Letters Patent.  Patented Jan. 16, 1917.

Application filed July 22, 1914, Serial No. 852,377. Renewed October 31, 1916. Serial No. 128,808.

*To all whom it may concern:*

Be it known that I, ROYAL A. WASS, a citizen of the United States, residing at Berkeley, in the county of Alameda and State of California, have invented new and useful Improvements in Mowing-Machines, of which the following is a specification.

This invention relates to mowing machines, and particularly to improvements in the sickle and support therefor.

It is an object of the present invention to provide means to prevent the clogging and stopping of the operation of the reciprocable sickle bar, with its knives, when encountering tough and heavy grass, weeds, or other growth.

By actual experience with mowing machines I have found that after use for a time the reciprocatory cutter knives wear and their adjacent supporting surfaces also wear and thus allow an undue vertical movement or play of the knives between the adjacent bearing surfaces. This play permits heavy and tough grass and weeds to become lodged between the knives and the adjacent bearing surfaces and readily cause the choking or clogging of the knives so as to prevent the reciprocation of the sickle bar with the knives.

The present invention is particularly designed to provide a means for compensating for the wear by adjusting one of the bearing members of the knives so as to eliminate unnecessary play permitted by the wear of the parts.

It is at the same time an important object of the present invention to provide means for taking up the wear which may be readily applied to standard machines on the market and in use without in any way altering the machine.

The invention consists of the parts and the construction and combination of parts as hereinafter more fully described and claimed, having reference to the accompanying drawings, in which—

Figure 1 is a plan view of a portion of the sickle beam and a portion of the sickle bar with knives attached and showing the improvement applied. Fig. 2 is an end view of the machine, showing the beam and sickle bar in cross section.

2 indicates a portion of a substantial beam which may be connected in any appropriate manner to the usual carriage or vehicle and 3 indicates a sickle bar reciprocated by any suitable mechanism operated by or mounted upon the mowing machine carriage, not shown. The sickle bar 3 lies parallel to and in front of the main beam 2 and is provided with a number of V-shaped blades or knives 4, the lower surfaces of which rest and reciprocate upon knife guards 5, of suitable type, which are secured by bolts, or other suitable means 6, to the main beam 2. The forwardly extending end of each knife guard is provided with an overhanging hook portion 7 for protecting the points of the knives 4.

The present invention resides particularly in an overhanging bearing comprising a lever 8 pivoted upon a bolt or other suitable pivot 9 which is removably mounted in a bearing or bracket 10 which may be secured by the same bolt or bolts 6 which fastens the knife guard 5 to the beam 2. The lever 8 is provided with a foot or wearing portion 11 adapted to be swung down toward the upper surface of the knives 4 in such juxtaposition as to allow for the easy reciprocation of the knives between the bearing surfaces of the guards 5 and the foot 11 of the lever.

The adjustment of the lever 8 toward the knives 4 is obtained by a set-screw 12 which is threaded in the rear end of the lever 8 and may be turned into contact with the adjacent surface of the bearing bracket 10. It is understood that there may be as many of the adjustable wearing devices, consisting of the brackets 10 and the levers 8, as may be desired mounted along the beam 2 so as to support the knives 4 efficiently. This device effectually provides means for preventing unnecessary vertical play between the bearing surfaces of the guards 5 and the foot of the clamp or take-up member 8.

For the purpose of providing for the lubrication of the bearing part 11 of the clamp or lever 8, the latter may be provided with a grease cup 13, having a screw-threaded piston 14 which may be adjusted at such intervals as may be desired to discharge grease from the cup 13 through a drill hole 15 leading to the bearing portion 11 of the clamp or lever 8. In the present instance the grease cup 13 is shown as cast integrally with the lever, in this manner providing at once for simplicity, cheapness of construction and the safety of the grease cup, as it is thus not liable to be broken off by the impact with grain, through which the machine may be traveling, or by contact with obstacles likely to be encountered.

From the foregoing it will be seen that I have provided a simple and practicable means for taking up the play produced by the wearing of the relatively moving parts of the mowing machine, and at the same time have provided means for lubricating these parts, thus tending to increase the life of the parts and reduce the friction of operation.

Having thus described my invention, what I claim and desire to secure by Letters Patent is—

1. In combination with the sickle bar and the knives of a mowing machine, a bracket borne by the machine, a bearing member pivoted to the bracket and having a foot which depends from the front end thereof and bears upon said knives, said bearing member having an upwardly extending projection at a point substantially over the pivotal point of said member, said projection being hollowed out to form a grease cup and being interiorly threaded and said member having a duct which leads from the grease cup through the bottom of the foot, a piston threaded into engagement with the threads of the grease-cup, and a set screw connected to the rear end of the member and bearing on a part of the machine to enable the degree of contact of the foot with the knives to be regulated.

2. In combination with the sickle bar and the knives of a mowing machine, a bracket borne by the machine, a bearing member, a transverse bolt passed through the bracket and member to provide a pivotal mounting for the latter, said bearing member having a foot which bears on the knives and also having a hollowed out portion at its top to provide a grease cup and further having a duct which leads from the cup through the bottom of the foot, and a closure for the grease-cup.

In testimony whereof I have hereunto set my hand in the presence of two subscribing witnesses.

ROYAL A. WASS.

Witnesses:
JOHN H. HERRING,
W. W. HEALEY.